United States Patent
Ford et al.

(10) Patent No.: US 10,652,319 B2
(45) Date of Patent: May 12, 2020

(54) METHOD AND SYSTEM FOR FORMING COMPUTE CLUSTERS USING BLOCK CHAINS

(71) Applicant: DELL PRODUCTS L.P., Round Rock, TX (US)

(72) Inventors: Daniel A. Ford, Mount Kisco, NY (US); Zhuoqun Cheng, Boston, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 232 days.

(21) Appl. No.: 14/971,342

(22) Filed: Dec. 16, 2015

(65) Prior Publication Data

US 2017/0180469 A1    Jun. 22, 2017

(51) Int. Cl.
   *H04L 29/08*  (2006.01)
   *H04L 12/26*  (2006.01)
   *H04L 12/24*  (2006.01)

(52) U.S. Cl.
   CPC ...... *H04L 67/1008* (2013.01); *H04L 41/0896* (2013.01); *H04L 43/087* (2013.01); *Y04S 40/162* (2013.01); *Y04S 40/168* (2013.01)

(58) Field of Classification Search
   CPC . H04L 67/1008; H04L 43/0858; H04L 43/04; H04L 43/087; H04L 41/0896; G06F 9/5072; G06F 9/5066; G06F 9/5083; G06F 9/4881; G06F 2209/5017; Y04S 40/168; Y04S 40/162
   See application file for complete search history.

(56) References Cited

U.S. PATENT DOCUMENTS

| | | |
|---|---|---|
| 4,078,152 A | 3/1978 | Tuckerman, III |
| 6,760,752 B1 | 7/2004 | Liu et al. |
| 7,149,896 B1 * | 12/2006 | Bahl ............... H04L 63/0428 713/166 |
| 7,200,226 B2 | 4/2007 | Bace |
| 7,280,956 B2 | 10/2007 | Cross et al. |
| 7,529,718 B2 | 5/2009 | Lambert |
| 8,316,237 B1 | 11/2012 | Felsher et al. |
| 8,458,462 B1 | 6/2013 | Hanna |
| 8,694,789 B2 | 4/2014 | Chapman |
| 9,397,985 B1 | 7/2016 | Seger, II et al. |

(Continued)

OTHER PUBLICATIONS

Volunteer Computing, Sep. 7, 2015, Wikipedia, pp. 1-4.*

(Continued)

*Primary Examiner* — Hua Fan
*Assistant Examiner* — Muhammad Raza
(74) *Attorney, Agent, or Firm* — Jackson Walker LLP; Christopher J. Rourk (57) ABSTRACT

A system for data processing is disclosed that includes a computing cluster allocation system operating on a processor and configured to receive a work project, to segment the work project into a plurality of tasks and to distribute the plurality of tasks to a plurality of anonymous computing units using a block chain algorithm, and a computing cluster monitor system operating on the processor and configured to receive data associated with the plurality of tasks from the computing cluster allocation and response data from the anonymous computing units and to determine whether the project has been completed.

18 Claims, 2 Drawing Sheets

(56) References Cited

U.S. PATENT DOCUMENTS

| | | | |
|---|---|---|---|
| 9,679,276 B1 | 6/2017 | Cuende | |
| 2006/0161773 A1* | 7/2006 | Okazaki | G06F 21/52 713/168 |
| 2007/0033247 A1* | 2/2007 | Martin | G06F 9/465 709/201 |
| 2008/0109500 A1* | 5/2008 | Macready | B82Y 10/00 708/2 |
| 2009/0187887 A1* | 7/2009 | Richins | G06F 9/445 717/120 |
| 2009/0271595 A1* | 10/2009 | Barsness | G06F 9/4405 712/229 |
| 2009/0307490 A1 | 12/2009 | Dancer | |
| 2010/0037067 A1 | 2/2010 | Rangadass et al. | |
| 2011/0041136 A1* | 2/2011 | Messier | G06F 9/5066 718/105 |
| 2011/0141974 A1 | 6/2011 | Lieberman | |
| 2011/0154044 A1 | 6/2011 | Spalka et al. | |
| 2012/0109812 A1 | 5/2012 | Hinkle et al. | |
| 2012/0233470 A1 | 9/2012 | Everett | |
| 2013/0007753 A1* | 1/2013 | Jain | G06F 9/46 718/103 |
| 2013/0031182 A1 | 1/2013 | Gross et al. | |
| 2013/0139165 A1* | 5/2013 | Doukhvalov | G06F 9/5072 718/102 |
| 2014/0164254 A1 | 6/2014 | Dimmick | |
| 2014/0215487 A1* | 7/2014 | Cherkasova | G06F 9/5083 718/106 |
| 2014/0351310 A1* | 11/2014 | Ligman | H04W 52/0209 709/201 |
| 2014/0359624 A1* | 12/2014 | Cherkasova | G06F 11/3404 718/100 |
| 2015/0026072 A1 | 1/2015 | Zhou et al. | |
| 2015/0227436 A1* | 8/2015 | Wilson | G06F 11/1453 707/692 |
| 2015/0379510 A1* | 12/2015 | Smith | G06Q 20/3829 705/71 |
| 2016/0005055 A1* | 1/2016 | Sarferaz | G06Q 30/0202 705/7.31 |
| 2016/0011901 A1* | 1/2016 | Hurwitz | G06F 9/4843 718/101 |
| 2017/0147410 A1* | 5/2017 | Burdick | G06F 9/5083 |
| 2017/0187535 A1* | 6/2017 | Middleton | H04L 9/3247 |

OTHER PUBLICATIONS

Bentov et al., Proof of Activity: Extending Bitcoin's Proof of Work via Proof of Stake, Dec. 2014, Performance Evaluation Review, vol. 42, No. 3, pp. 34-37. (Year: 2014).*

Garay et al., The Bitcoin Backbone Protocol: Analysis and Applications, Apr. 14, 2015, Springer, Lecture Notes in Computer Science, vol. 9057, pp. 281-310. (Year: 2015).*

Pellicer et al., Distributed MD4 Password Hashing with Grid Computing Package BOINC, 2004,Springer-Verlag Berlin Heidelberg, pp. 679-686. (Year: 2004).*

Anderson et al., High-Performance Task Distribution for Volunteer Computing, 2005, IEEE, pp. 1-8. (Year: 2005).*

* cited by examiner

METHOD AND SYSTEM FOR FORMING COMPUTE CLUSTERS USING BLOCK CHAINS

TECHNICAL FIELD

The present disclosure relates generally to distributed computing, and more specifically to a method and system for forming compute clusters using block chains.

BACKGROUND OF THE INVENTION

Traditional approaches to large-scale distributed computing projects utilize a client-server architecture. In this approach, multiple "client" computers establish connections to a single "server" computer, that acts as a centralized coordinator of communications and work assignments that are delegated to the client machines. The collection of clients so connected and managed by a server forms a compute cluster.

SUMMARY OF THE INVENTION

A system for data processing is disclosed that includes a computing cluster allocation system that operates on a processor, and that is configured to receive a work project, such as a data set and associated algorithms, and to segment the work project into a plurality of tasks, such as by segmenting the data and grouping the segmented data with associated algorithms. The computing cluster allocation system can distribute the plurality of tasks to a plurality of anonymous computing units using a block chain algorithm or other suitable mechanisms. A computing cluster monitor system operating on the processor is configured to receive data associated with the plurality of tasks from the computing cluster allocation and response data from the anonymous computing units and to determine whether the project has been completed, such as by mapping the responses to a task template or in other suitable manners.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

One problem solved by this invention is the formation and coordination of anonymous and autonomous computing resources to form a distributed compute cluster of arbitrary size. As discussed, traditional approaches to large-scale distributed computing projects, such as Folding@home, Einstein@home and Berkeley Open Infrastructure for Network Computing (BOINC), use a client-server architecture. This architecture works well in certain environments and configurations, but it inherently suffers from a number of weaknesses, one of which is that a client needs to "trust" the server with its identity (e.g., IP address) in order to participate in the compute cluster. In addition, communications between the client and the server are typical direct (i.e. machine-to-machine) messages, so the server needs to know enough information about the client to direct and address its communications to the client, which eliminates the possibility for client anonymity. Concomitant with this communications regime is the need for the clients to know the details of the server, which eliminates the possibility of server anonymity. The establishment and management of such communications tends to force a certain amount of organizational "locality" on the collection of machines participating in the cluster, where the clients and server will tend to be owned and managed by the same organization. This in turn will tend to limit the size of the compute cluster to the ability of the organization to marshal and manage machines. For example, if an organization directly owns and controls one thousand machines, it will typically limit their ability to form a compute cluster with more than that many processors.

One solution to the problem of forming and coordinating anonymous and autonomous computing resources to form a distributed computing cluster of arbitrary size, is to employ indirect communications between clients and servers by using a cryptocurrency block chain as a secure distributed communication channel. A block chain is a distributed data store that maintains a continuously growing list of data records. Some advantages of the block chain architecture include the following: 1) The ability of a large number of compute nodes to converge on a single consensus of a large data set, even when the nodes are run autonomously and cannot, in general, be "trusted." 2) Every such node has a complete or partial copy of the block chain. This avoids the need to have a centralized database, making it less vulnerable to natural disasters and malicious attacks.

The basic idea of the invention is to use the block chain to enable highly scalable indirect communications between clients and servers, such that neither needs to know the exact identity of the other. This allows the cluster to grow to include machines that are not directly managed by a particular organization. Block chain communications also scale extremely well through the distribution of the block chain through a highly distributed peer-to-peer network of the nodes that maintain the block chain. This configuration eliminates many constraints on the size of the cluster simply due to organizational or communications limitations.

An example of how a block chain can be used to create a compute cluster is by using the capabilities of the Ethereum cryptocurrency block chain. This block chain allows data to be stored in the form of "contracts." A contract is an array of storage space allocated in a "transaction" in a "block" of the block chain. The array contains data representing the contract's "internal state," as well as a possible bytecode of a program that defines a set of functions to manipulate that data. Each contract has a unique 160-bit address.

Consider as an example the formation of a compute cluster to factor an integer. The server creating the cluster could create a contract that includes the integer to be factored, the pool of potential, untested factors to be tried, the number of worker nodes and their ID (i.e., 160-bit public key), and some reserved space for results to be returned. This contract could also provide functions to update the large number, to expand/shrink/split/merge the pool of potential factors, to increment/decrement the number of worker nodes, and to upload a result to be stored in the contract. When this contract is stored in a transaction in the block chain (with both a description and the 160-bit address), it can be discoverable by all potential compute nodes.

If a node is interested in participating in the computation, it can signal this interest by updating the contract by creating a transaction to update the worker count. The server node that created the contract can monitor transactions sent to the contracts address and recognize the change in the worker count. It can then enter a transaction to call the function to re-divide the pool of potential factors and index each portion with registered worker ID. The participating client nodes can also be monitoring any changes in the contract, can be (re)-initialized to accommodate any changes, and can continue with their computations (i.e., factoring) with the updated configuration.

When a client node finishes its assigned work, it can create another transaction to upload its results and update the contract. If the result is the discovery of a factor, the server node can subsequently also update the contract to either terminate the computation, or reassign work. The transactions can be mined into the block chain and propagated to every node. Though the work might progress slowly, the computational task can be completed by a compute cluster of an arbitrary size, formed from anonymous and autonomous computing resources.

Figure 1:
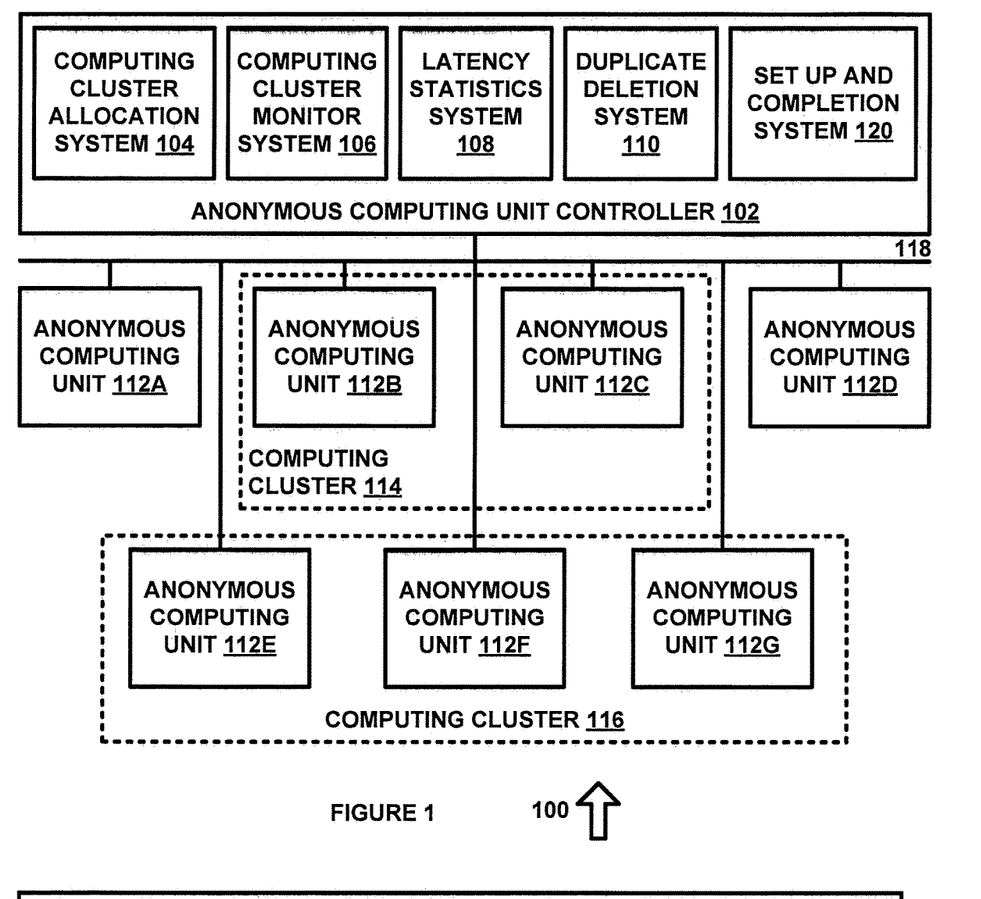
FIG. 1 is a diagram of a system for anonymous computing control, in accordance with an exemplary embodiment of the present disclosure.

FIG. 1 is a diagram of a system 100 for anonymous computing control, in accordance with an exemplary embodiment of the present disclosure. System 100 includes computing cluster allocation system 104, anonymous computing unit controller 102, computing cluster monitor system 106, latency statistics system 108, duplicate deletion system 110, set up and completion system 120, anonymous computing units 112A through 112G, computing cluster 114, computer cluster 116 and network 118, each of which can be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Computer cluster allocation system 104 receives work packages and allocates the work package to a plurality of anonymous computing units. In one exemplary embodiment, computer cluster allocation system 104 can determine a breakdown of the work package as a function of different algorithms, data sets, or other suitable parameters, and can further determine a sequence of computing processes to be performed in parallel or in series. Computer cluster allocation system 104 can break the work package down into separate assignments for each of the anonymous computing units, can determine a sequence of the assignments and assign a sequence number to the assignment, and can perform other suitable processes. For example, computer cluster allocation system 104 can receive a work package of an animation sequence for rendering, and can separate the animation sequence into a series of assignments 1 through N, where each assignment includes the data and algorithms needed to render a predetermined number of frames of the animation sequence. In this exemplary embodiment, the size of the assignment can be adjusted as a function of a processor capacity for each of the anonymous computing units, a memory capacity, a processing speed, a location, a security ranking or other suitable attributes, such as to allow the allocation of assignments to anonymous computing units that are optimized for the associated algorithms and data processing. Anonymous computing units can be ranked as a function of computing power, memory, processing speed, processing capacity, location, security or other suitable variables, and computer cluster allocation system 104 can use the rankings of individual anonymous computing units to determine whether to issue an assignment to the anonymous computing unit.

In one exemplary embodiment, each task assigned to an anonymous computing unit can have an associated identifier, so as to allow a work project to be broken down into a plurality of tasks, and for those tasks to be assigned to different anonymous computing units on a random basis, in accordance with predetermined criteria, or in other suitable manners. In this exemplary embodiment, a block chain can be used, where the plurality of tasks are stored as successive data units in the block chain. In this exemplary embodiment, the most current task can be assigned to an anonymous computing unit, which can then delete the most current block and forward the block chain to another anonymous computing unit, which can accept the next task in the chain (which is then the most current task) before repeating the process. In another exemplary embodiment, each anonymous computing unit can forward the block chain to two or more additional anonymous computing units, to create a desired level of redundancy, such as based on latency statistics. In yet another exemplary embodiment, multiple chains can be instantiated in order to create a desired level of redundancy. The tasks can also or alternatively be addressed to anonymous computing units having predetermined characteristics, a test algorithm can be used to determine whether the current anonymous computing unit has a sufficient processing speed or other suitable parameters to perform the task, or other suitable processes can also or alternatively be used to assign tasks to anonymous computing units.

Computing cluster monitor system 106 monitors a group of anonymous computing units that have been assigned as a computer cluster. In one exemplary embodiment, computing cluster monitor system 106 can receive data from each of the anonymous computing units as they complete their assigned tasks, and can determine whether suitable progress is being made or if additional computing units are required, such by tracking the number of completed assignments and comparing that to the total number of assignments that have been issued, by tracking results as a function of a type of assignment, size of assignment, location, security or other anonymous computing unit classifications, or in other suitable manners.

Latency statistics system 108 receives latency data from anonymous computing units and determines whether to increase or decrease the number of anonymous computing units that have been assigned to a task as a function of delivery date. In one exemplary embodiment, a large population of anonymous computing units can be provided with corresponding assignments, where the completion of the assignments can have an asymptotic response. In this exemplary embodiment, the time required for an average anonymous computing unit to return results can be determined and used to allocate additional anonymous computing units to a workload, or for other suitable purposes. For example, if the typical response of anonymous computing units follows a normal distribution, the time required for a project to be completed can be approximated early on in the process, and additional anonymous computing units can be allocated quickly, in order to result in project completion by a predetermined time. For example, if 100,000 anonymous computing units are assigned to a task, but if only 100 have completed their part of the task by a first time T1 when a normal distribution would require 200 to have completed their task by that time in order to meet a final deadline of T2, then the number of anonymous computing units assigned to the task can be doubled to 200,000, or other suitable changes can be implemented, such as by assigning the tasks to anonymous computing units with more processing power, with a higher processing speed, with greater data storage or in other suitable manners.

Duplicate deletion system 110 receives computing task results from anonymous computing units, verifies which results are duplicates and deletes the duplicate results. In one exemplary embodiment, duplicate deletion system 110 can determine whether two unrelated anonymous computing units were assigned to process the same data set with the same algorithm, and can then confirm whether they reached the same result. If the duplicate anonymous computing units reached the same result, then the duplicate result can be deleted. Alternatively, if the results are different, then additional analysis can be used to determine the reason for the different results, such as processes to determine whether an assigned anonymous computing unit misoperated, has been compromised or other suitable processes.

Anonymous computing units 112A through 112G are distributed computing units that are connected to a communications medium such as network 118. In one exemplary embodiment, network 118 can be the Internet, a wired or wireless data network, other suitable data networks or a suitable combination of data networks. Each anonymous computing unit 112A through 112G has a predetermined computing capacity, data capacity, and other appropriate performance metrics. Furthermore, work packages can be allocated to each anonymous computing unit 112A through 112G using a block chain communications protocol, such as where the operator of each anonymous computing unit 112A through 112G receives compensation for making their computing unit available. In this exemplary embodiment, a large number of discrete amounts of processor workload can be transmitted to a large number of anonymous computing units, most of which will complete their task, but some of which may be turned off, disabled, or otherwise unable to complete their task. For example, a project can include a project data set and one or more associated project algorithms, and computing cluster allocation system 104 can segment the project data set into a plurality of task data sets, where each task data set is associated with one or more of the project algorithms. The task data sets and task algorithms can then be grouped as a "task" that can be performed in series or parallel with other tasks of the project. In this manner, sending duplicate tasks to the anonymous computing units can ensure that the segmented workload results converge upon a complete solution within a predetermined acceptable period of time.

Computing cluster 114 is an exemplary computing cluster comprising anonymous computing units 112B and 112C. Computing cluster 116 is an exemplary computing cluster comprising anonymous computing units 112E, 112F and 112G. In this exemplary embodiment, the anonymous computing units of computing clusters 114 and 116 can be assigned different sets of tasks using a block chain as a communications channel, so as to allocate computing workload to multiple independent and anonymous computing units. For example, if the response time for completion of a project for a single computing unit is X, and the project can be broken down into a series of Y independent tasks that can be performed in parallel, where the response time for each processor that is assigned one of the Y tasks follows a normal statistical distribution, then multiple anonymous computing units can be assigned to process each of the independent tasks, so as to result in completion of the project by a predetermined time that is less than X but greater then X/Y.

Set up and completion system 120 performs project scheduling for a large computing workload that has been broken down into a number of different tasks, such as to perform the set up work associated with allocating the tasks to anonymous computing units, the completion work that is required to complete tasks that have not been completed, the assembly of the finished project and other suitable tasks. In one exemplary embodiment, a large computing workload project can be broken down into a plurality of small tasks that are assigned to a set of distributed anonymous computing units, which can perform the tasks in accordance with a normal distribution, such as due to such computing units being damaged, being removed from service, or due to other random operating conditions beyond the control of the project scheduling system. In this exemplary embodiment, if completion of a project depends on a small number of uncompleted tasks, set up and completion system 120 can identify the tasks based on reported results and can perform the outstanding tasks, so as to eliminate the need to wait for the tasks to be completed by the assigned anonymous computing units, which might be out of service due to malfunction, loss of power or other reasons.

In operation, system 100 allows large workloads to be processed using computing capacity that would otherwise be dormant, such as to render video animation, bioinformatics or other suitable applications where a large data set must be processed in a manner that can be performed in parallel by a large number of distributed processors. In this exemplary embodiment, installed processors for low demand applications such as smart meters, set top boxes, and other suitable devices can be utilized, so as to allow a computing workload to be segmented and distributed to such distributed processors, which are configured to operate as anonymous computing units. However, due to the inherent difficulty of communicating between a large number of devices using a single scheduling server, the present disclosure can use a block chain for communication, where users receive an incentive for allowing their processors to be made available to assist with processing, and where communication between processors is performed using an ad hoc communications network, or other suitable processes can also or alternatively be used.

Figure 2:
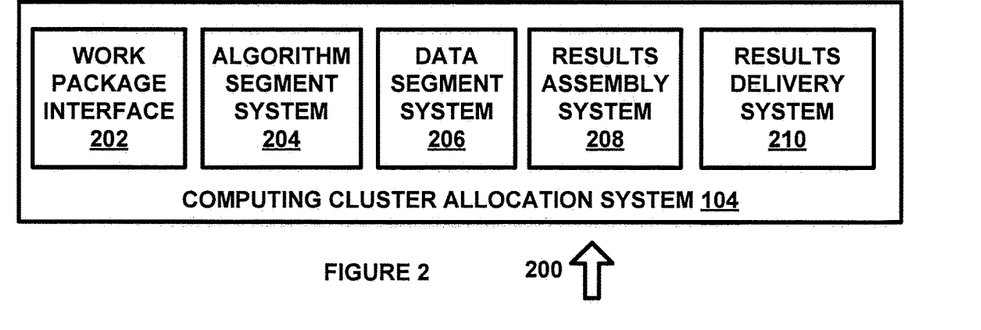
FIG. 2 is a diagram of a system for computer cluster allocation, in accordance with an exemplary embodiment of the present disclosure.

FIG. 2 is a diagram of a system 200 for computer cluster allocation, in accordance with an exemplary embodiment of the present disclosure. System 200 includes computer cluster allocation system 104 and work package interface 202, algorithm segment system 204, data segment system 206, results assembly system 208 and results delivery system 210, each of which can be implemented in hardware or suitable combination of hardware and software.

Work package interface 202 allows a user to submit a work package for processing. In one exemplary embodiment, the user can select from a set of available algorithms, data types, or other suitable work package selection parameters, and can select a price, completion time, or other suitable processing variables. In another exemplary embodiment, the user can select the characteristics of anonymous computing unit processors that are desired to perform the work, such as based on a processor type, processor speed, data storage capacity, location, security level or other suitable characteristics. In this exemplary embodiment, certain types of anonymous computing units might be better configured for a task, can be in a location where the use of the anonymous computing unit for the task is allowed, or can otherwise have user-selectable characteristics that can be aligned with a type of data processing project.

Algorithm segment system 204 receives work package data from work package interface 202 and determines algorithmic processes that can be performed in parallel and in series for the data set. In one exemplary embodiment, a digital animation feature can be rendered, where the sequence of animation can be segmented into one second segments, 10 second segments, and so forth. In this exemplary embodiment, the segmented algorithms and associated data can be processed using a block chain communications process, to allow the data to be distributed to a large number of anonymous computing units. Each package of data can be assigned a sequence number, and duplicate packages can also be used to facilitate completion of the work within a predetermined period of time.

Data segment system 206 receives a data set and segments it for distributed computing. In one exemplary embodiment, processing of data sets can be independent of the installation of data processing algorithms on separate processors, where each processor receives a subsequent data set after completion of current data set. In this exemplary embodiment, data segment system 206 can track the progress of processing of segmented data sets by a distributed set of anonymous computing units and can assign new or redundant data sets to additional units, where needed. Likewise, other suitable data segmentation processes can also or alternatively be used.

Results assembly system 208 receives results from distributed anonymous computing units and assembles the results into a final product. In one exemplary embodiment, the results can be delivered stochastically, such that the final assembly cannot be completed until all results of been received. Results assembly system 208 can map the responses to a task template, a task sequence listing or can use other suitable processes to determine whether each task has been completed, which tasks are outstanding and other suitable status data.

Results delivery system 210 schedules delivery of results to a recipient. In one exemplary embodiment, the results can be delivered in predetermined units, as a single unit or in other suitable manners. The results can also or alternatively be scheduled to different addresses, for delivery at predetermined times, for resubmission as a work package to work package interface 202 for subsequent segmentation into tasks and processing by anonymous computing units, or in other suitable manners.

In operation, system 200 allows a user to interface with a computer cluster scheduling system to schedule a project, such as to configure handling of the work project, to select options for processing of the work project and for other suitable purposes. System 200 thus allows the processing of work projects by a computer cluster to be automated, and avoids the need to manually configure work projects for processing by distributed anonymous processing units.

Figure 3:
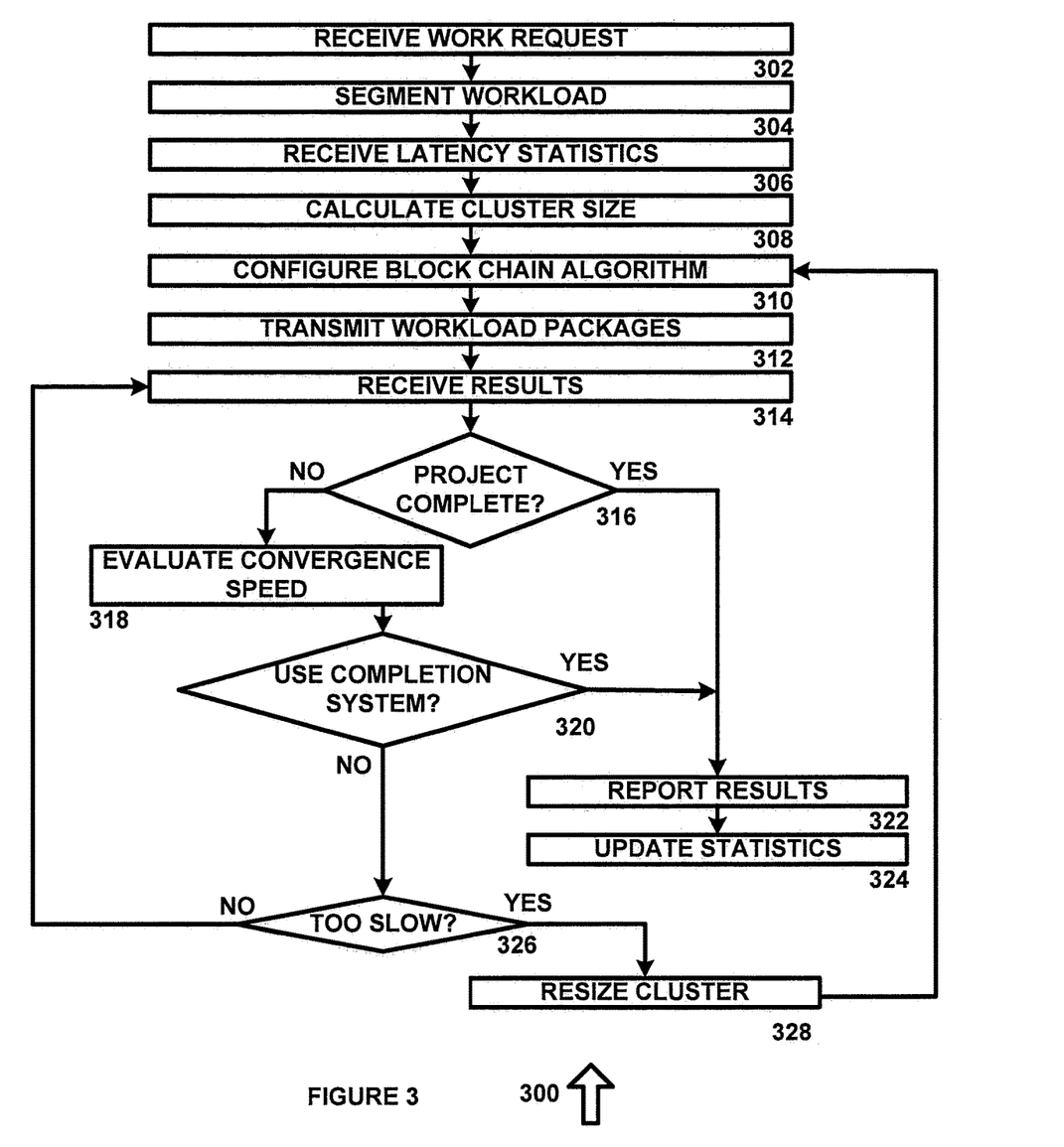
FIG. 3 is a diagram of an algorithm for scheduling a segmented workload in accordance with an exemplary embodiment of the present disclosure.

FIG. 3 is a diagram of an algorithm 300 for scheduling a segmented workload in accordance with an exemplary embodiment of the present disclosure. Algorithm 300 can be implemented in hardware or suitable combination of hardware and software.

Algorithm 300 begins at 302, where a work request is received. In one exemplary embodiment, the work request can include a selected type of algorithm or algorithms, a selected data set, a selected timeframe, a selected price or other suitable selections that are used to determine how to segment the work request for assignment to a plurality of anonymous computing units. The algorithm then proceeds to 304.

At 304, the workload is segmented. In one exemplary embodiment, a data set and associate algorithms can include segments that can be performed in series by distributed anonymous computing units, segments that can be performed in parallel by anonymous computing units and other suitable segments, such as where the segments are used to generate workload output that can be reassembled into a completed project. The algorithm then proceeds to 306.

At 306, latency statistics are received. In one exemplary embodiment, latency statistics can be generated as a function of an algorithm type, a data type, a processor type, a processor speed, a processor location or other suitable variables, so as to allow accurate estimates to be determined of a number of anonymous computing units that may be required for a project. The algorithm then proceeds to 308.

At 308, computing cluster sizes are calculated. In one exemplary embodiment, computing cluster sizes can be based on a number of redundant anonymous computing units that are required for a data set, a required project completion time or on other suitable variables. The algorithm then proceeds to 310.

At 310, a block chain algorithm is configured, such as to result in transmission of instructions, data, results, or other suitable components of the cluster. In one exemplary embodiment, the block chain algorithm can be configured to be received by predetermined computing units, such as where each computing unit receives an identifier at registration that identifies the characteristics of that computing unit, such as a field for the processing speed, a field for the data storage capacity, a field for the number of arithmetic units, a field for a location, a field for a security classification, a unique unit identifier and other suitable fields. The block chain algorithm configuration can include specifications for these and other fields, to help control the number of anonymous computing units that are assigned to a specific task. For example, a work project can be designed for processing 20 tasks in parallel by 100 anonymous processing units, based on latency data that indicates a 90% chance of a response within 10 minutes and a 99% chance of a response within 60 minutes for anonymous computing units of size X1, with a processing speed of X2, with a data storage capacity of X3, with a math coprocessor of X4, with a location of X5 and a security classification of X6, where X1-X6 are fields having a predetermined size and predetermined field values. In order control the number of anonymous computing units that are assigned to each task, the block chain algorithm can address the first task to registered anonymous computing units having an identifier of X1X2X3X4X5X6000N, where N is an integer between 1 and 5, can address the second task to anonymous computing units having the same identifier where N is an integer between 6 and 10, and so forth, so as to limit the number of anonymous computing units assigned to each task by address. Likewise, other suitable assignment mechanisms can also or alternately be used, such as assignment mechanisms that increment each time a block chain message is forwarded, assignment mechanisms that include a key associated with predetermined anonymous computing units and so forth. The algorithm then proceeds to 312.

At 312, workload packages are transmitted to the anonymous computing units. In one exemplary embodiment, the workload packages can be transmitted using a block chain algorithm that is addressed to predetermined anonymous computing units, that has a suitable assignment mechanism, or in other suitable manners. The algorithm then proceeds to 314.

At 314 results are received. In one exemplary embodiment, the anonymous computing units can be instructed to transmit results to a predetermined address once they are available, to retransmit the results until a confirmation response is received, or to perform other suitable functions. The algorithm the proceeds to 316.

At 316 it is determine whether a project is complete, such as by determining whether a solution for each of a plurality of tasks has been received. If it is determined that the project is not complete, the algorithm proceeds to 318 where the convergence speed is evaluated. If it is determined that the conversion speed is too slow at 320, the algorithm proceeds to 326 where the computing cluster is resized or other suitable processes are implemented to increase the convergence speed, and the algorithm the returns to 310. Otherwise, if it is determined that the convergence speed is not too slow, the algorithm returns to 314.

If it is determined at 316 that the project is complete, the algorithm proceeds to 322 where the results are reported. The algorithm then proceeds to 324, where statistics are updated, such as latency statistics.

In operation, algorithm 300 allows complex computational workloads to be distributed to anonymous computing clusters for use of otherwise unused computing capacity.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for data processing, comprising:
a computing cluster allocation system operating on a hardware processor and configured to receive a work project, to segment the work project into a plurality of tasks and to distribute the plurality of tasks to a plurality of anonymous computing units using a block chain algorithm;
a computing cluster monitor system operating on the hardware processor and configured to receive data associated with the plurality of tasks the computing cluster allocation system and response data from the anonymous computing units, to determine whether the project has been completed, and to cause the computing cluster allocation system to distribute one or more of the plurality of tasks to a second plurality of anonymous computing units if it is determined that the project has not been completed; and
a work package interface operating on the hardware processor and configured to receive work package data from a user including each of hardware processor speed and hardware processor security level and each of an algorithm selection and an anonymous computing unit hardware processor characteristic and to apply the algorithm selection and the anonymous computing unit hardware processor characteristic to the plurality of anonymous computing units that will process the work package as a function of the hardware processor speed and the hardware processor security level of the anonymous computing level hardware processors to 1) determine latency statistics as a function of hardware processor speed, data storage size and hardware processor location of each anonymous computing unit from the response data, to further determine a response time characteristic for the anonymous computing units using the hardware processor, 2) increase a number of anonymous computing units that are to be assigned a task in response to the determined latency statistics indicating that a response time will not be met, and 3) to decrease a number of anonymous computing units that are to be assigned a task in response to the determined latency statistics indicating that a response time will be exceeded.

2. The system of claim 1 further comprising a latency statistics system operating on the hardware processor and configured to receive the response data from the anonymous computing units and to determine latency statistics for determining a response time characteristic for the anonymous computing units as a function of location, hardware processor size and data storage capacity and to increase or decrease a number of anonymous computing units that are to be assigned a task as a function of a delivery date.

3. The system of claim 1 further comprising a duplicate deletion system operating on the hardware processor and configured to receive the response data from the anonymous computing units and to delete duplicate results for one of the plurality of tasks after verifying that a result associated with the response data is the same and updating the latency statistics using the duplicate results.

4. The system of claim 1 further comprising a set up and completion system operating on the hardware processor and configured to receive data associated with the plurality of tasks and to perform set up work that is required to configure the plurality of tasks and completion work that is required to complete the work project after the plurality of tasks have been completed by determining whether a predetermined number of uncompleted tasks remains and to assign duplicate tasks to other anonymous computing units as a function of updated latency statistics.

5. The system of claim 1 further comprising an algorithm segment system operating on the hardware processor and configured to receive a data set and latency statistics and to identify first algorithmic processes that can be performed in parallel and second algorithmic processes that can be performed in series for the data set using a block chain communication process as a function of the data set and the latency statistics.

6. The system of claim 1 further comprising a data segment system operating on the hardware processor and configured to receive a data set and to segment the data set for use with distributed anonymous computing units as a function of progress of each segment of the segmented data set and a plurality of estimated hardware processor speeds and estimated data memory sizes of the anonymous computing units.

7. The system of claim 1 further comprising a results assembly system operating on the hardware processor and configured to receive data processing results from distributed anonymous computing units, to map the data processing results to a task template and to assemble the results into a results package as a function of resubmission of a work package.

8. The system of claim 1 further comprising a results delivery system operating on the hardware processor and configured to schedule delivery of a results package generated by a plurality of anonymous computing units to a plurality of different recipients.

9. A method for data processing, comprising:
receiving a work project by a computing cluster allocation system operating at a hardware processor;
receiving, by a work package interface operating on the hardware processor, work package data from a user including each of hardware processor speed and hardware processor security level and each of an algorithm selection and an anonymous computing unit hardware processor characteristic;
applying, by the work package interface, the algorithm selection and the anonymous computing unit hardware processor characteristic to the plurality of anonymous computing units that will process the work package as a function of the hardware processor speed and the hardware processor security level of the anonymous computing level hardware processors;
segmenting, by the computing cluster allocation system, the work project with the hardware processor into a plurality of tasks;
distributing, by the computing cluster allocation system, the plurality of tasks to a plurality of anonymous computing units using a block chain algorithm;
receiving, by a computing cluster monitor system operating at the hardware processor, data associated with the plurality of tasks from the computing cluster allocation system and response data from the anonymous computing units at the hardware processor;
determining, by the computing cluster monitor system, whether the work project has been completed and to cause the computing cluster to distribute one or more of the plurality of tasks to a second plurality of anonymous computing units in response to the determination that the project has not been completed;
determining latency statistics as a function of hardware processor speed, data storage size and hardware processor location of each anonymous computing unit from the response data, for determining a response time characteristic for the anonymous computing units using the hardware processor;
increasing a number of anonymous computing units that are to be assigned a task in response to the determined latency statistics indicating that a response time will not be met; and
decreasing the number of anonymous computing units that are to be assigned the task in response to the determined latency statistics indicating that a response time will be exceeded.

10. The method of claim 9 further comprising:
receiving the response data from the anonymous computing units at the hardware processor;
determining whether two or more responses for each of a plurality of tasks are duplicates received from different anonymous computing units for two or more classes of anonymous computing units as a function of hardware processor speed, data storage size and hardware processor location of each anonymous computing unit; and
deleting duplicate results for one of the plurality of tasks using the hardware processor.

11. The method of claim 9 further comprising:
receiving data associated with the plurality of tasks at the hardware processor;
setting up the plurality of tasks for processing by a plurality of anonymous computing units; and
assigning additional work after the plurality of tasks have been partially completed to complete the work project by assigning uncompleted tasks to additional anonymous computing units.

12. The method of claim 9 further comprising:
receiving work package data from a user and one or more of an algorithm selection and an anonymous computing unit hardware processor characteristic including two or more of location, security level and memory capacity; and
using the algorithm selection and/or the anonymous computing unit hardware processor characteristic for processing the work package with the plurality of anonymous computing units as a function of the two or more of location, security level and memory capacity.

13. The method of claim 9 further comprising:
receiving a data set at the hardware processor;
identifying a first algorithmic process with the hardware processor that can be performed on the data set in parallel as a function of two or more of location, security level and memory capacity; and
identifying a second algorithmic process with the hardware processor that can be performed on the data set in series as a function of two or more of location, security level and memory capacity.

14. The method of claim 9 further comprising:
receiving a data set at the hardware processor; and
segmenting the data set for use with distributed anonymous computing units as a function of historical data for each of a plurality of tasks, where each task has a different associated profile and a number of assigned anonymous computing units for each task is different.

15. The method of claim 9 further comprising:
receiving data processing results at the hardware processor from distributed anonymous computing units;
assembling the results into a results package using the hardware processor; and
assigning additional tasks to additional anonymous computing units as a function of uncompleted tasks.

16. The method of claim 9 further comprising scheduling delivery of a results package generated by a plurality of anonymous computing units to a recipient using the hardware processor as a function of historical data for a plurality of anonymous computing units for a plurality of different tasks, where each of the plurality of different tasks has a different response time characteristic.

17. A method for data processing, comprising:
receiving a work project at a computing cluster allocation system operating on a hardware processor;
receiving, by a work package interface operating on the hardware processor, work package data from a user including each of hardware processor speed and hardware processor security level and each of an algorithm selection and an anonymous computing unit hardware processor characteristic;
applying, by the work package interface, the algorithm selection and the anonymous computing unit hardware processor characteristic to the plurality of anonymous computing units that will process the work package as a function of the hardware processor speed and the hardware processor security level of the anonymous computing level processors;
controlling the computing cluster allocation system of the hardware processor to segment the work project into a plurality of block chain computing tasks using response time statistics for a plurality of anonymous computing units;
controlling the computing cluster allocation system of the hardware processor to distribute the plurality of block chain computing tasks to the plurality of anonymous computing units as a function of the block chain algorithm and the response time statistics;
receiving, by a computing cluster monitor system operating at the hardware processor, data associated with the plurality of tasks from the computing cluster allocation system and response data from the anonymous computing units at the hardware processor;
controlling the hardware processor to determine, by the computing cluster monitor system, whether the work project has been completed and to cause the computing cluster to distribute one or more of the plurality of tasks to a second plurality of anonymous computing units in response to the determination that the project has not been completed;
updating the response time statistics;
determining latency statistics as a function of hardware processor speed, data storage size and hardware processor location of each anonymous computing unit from the response data, for determining a response time characteristic for the anonymous computing units using the hardware processor;
increasing a number of anonymous computing units that are to be assigned a task in response to the determined latency statistics indicating that a response time will not be met; and
decreasing the number of anonymous computing units that are to be assigned the task in response to the determined latency statistics indicating that a response time will be exceeded.

18. The method of claim 17 further comprising using the updated response time statistics to segment and distribute additional block chain computing tasks.

* * * * *